May 23, 1933.  C. DAUM  1,910,380
FOOD SLICER
Filed April 25, 1931
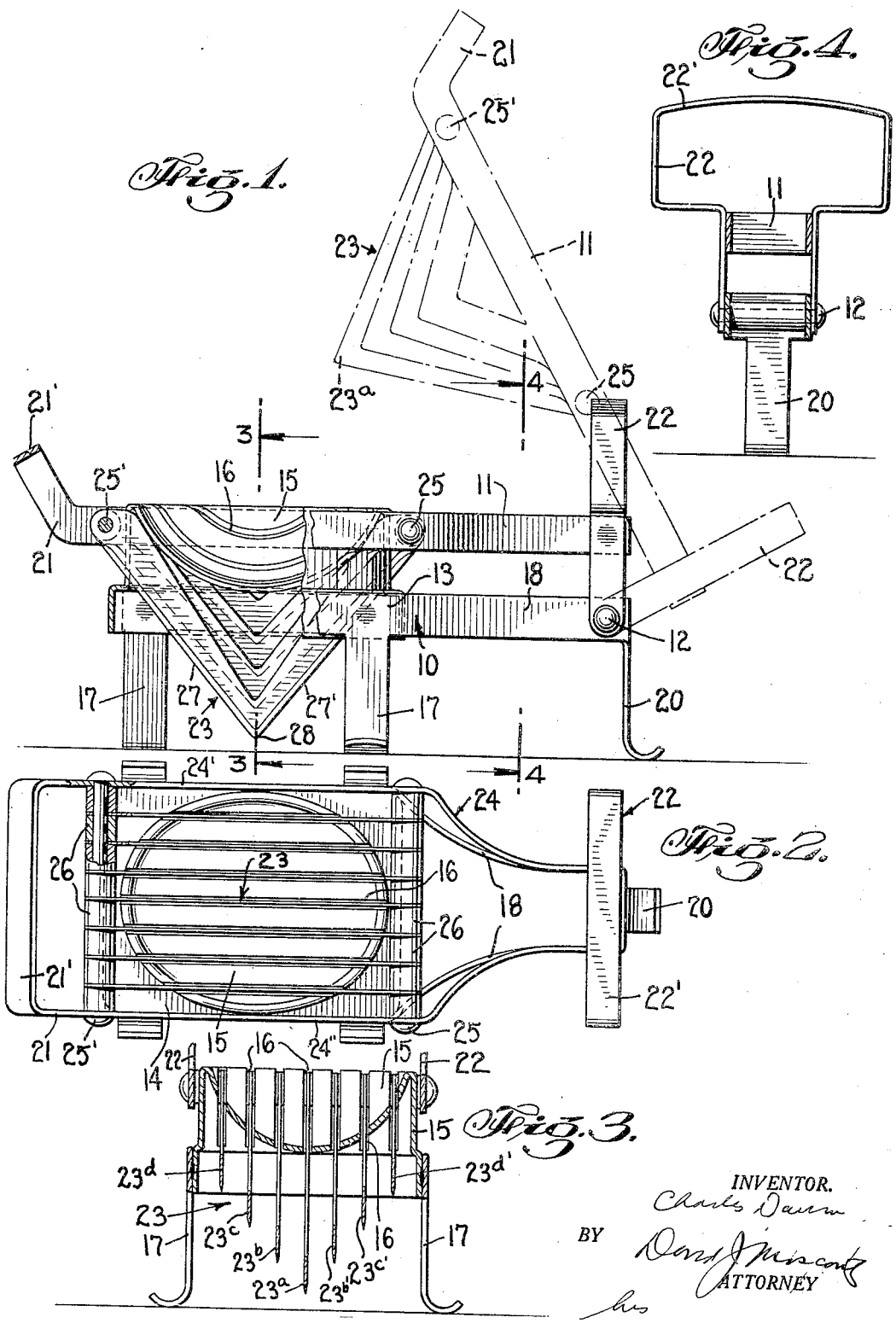
INVENTOR.
Charles Daum
BY
ATTORNEY Patented May 23, 1933

1,910,380

UNITED STATES PATENT OFFICE

CHARLES DAUM, OF NEW YORK, N. Y.

FOOD SLICER

Application filed April 25, 1931. Serial No. 532,819.

This invention relates to improvements in food slicing devices, being particularly directed to a mechanism adapted, by means of a single stroke of a pivoted mechanism, to cut an entire product into a series of slices equidistantly spaced apart.

In slicing food products, such as tomatoes, oranges and lemons, considerable difficulty has been encountered due to the comparative flexibility or resiliency of the skins or rinds thereof, in conjunction with the properties of toughness possessed by such skins or rinds, together with the fact that often the interior of the product may be very ripe and soft. The ordinary knife blade used in cutting or slicing such food products, unless it is unusually sharp and has a piercing point at one edge thereof, must first penetrate the skin or rind of the product at a particular point or area before the complete operative length of the blade may carry out its function of cutting the peripheral surface, and then slicing the meaty interior of the product.

If the blade of such knife is not sharp, or the surface of the food product above specified, is not pierced at the commencement of the cutting operation, the product may not be evenly cut, and if the interior or meaty portion of such product is soft, due to the ripeness of the same, the meaty portion is either crushed or caused to be displaced, with the result that the skin or rind of the product breaks at a point or area far removed from the contemplated cutting portion, and any attempt at cutting clean and even slices becomes unsuccessful.

It is to obviate this difficulty that this invention provides for the use of a series of blades of a particular formation, assembled to operate as a unit at pivoted relationship with respect to the food holder, the blade unit being caused, by the rocking of the carrier therefor about a pivot, to be downwardly and angularly displaced towards and against the peripheral surface of the food product for the purpose of successively and progressively piercing and then slicing the product along its peripheral surface in a prescribed spacial relationship so as to provide for a series of slices of pre-determined thickness; the slices being even and clearly defined by virtue of the attainment of a proper point of cutting progressively for the respective segments on the peripheral surface of the food product, and the proper application of a cutting surface of the blade to the skin or rind and then the meaty interior of the food product, as the cutting unit is displaced in its downward and angular movement.

These and other advantages, capabilities and features of the invention will appear from the subjoined detail description of one specific embodiment therefor illustrated in the accompanying drawing, in which Figure 1 is a front view of the device, showing the position of some of the elements thereof in different stages of operation.

Figure 2 is a plan view, partly in section, of the device.

Figure 3 is an end elevation, partly in section, along lines 3—3 of Figure 1.

Figure 4 is an end elevation taken along lines 4—4 of Figure 1.

Referring to the reference characters in the drawing, numeral 10 represents the base forming the support for the cutting element 11 pivotally mounted on a bolt 12 at one end of the top surface 13 of said support; part of the upper surface of said support being stamped out to form a receptacle 14 having an oval shaped substantially arcuate carrying portion 15.

The surface of the receptacle, including the arcuate surface of the carrying portion, has a series of slots 16 extending substantially from end to end of said surface, which slots are parallelly disposed one with respect to the other and substantially equidistant one from the other (see Figures 2 and 3).

The support 10 has formed thereon integral legs 17 directly under the receptacle portion thereof; and the main body thereof, adjacent the upper surface has integrally extending arcuately curved arms 18, through which pass the bolt 12 carrying the pivoted cutting element 11, to be later described. Integral with the arcuate arms and depending therefrom, there is provided a supporting leg 20 to balance the base forming the support.

The pivoted cutting element comprises a stamped metal frame 11 substantially of the same cross sectional shape as the base forming the support except, however, that it has a gripping portion 21 at one end and a holding portion 22 at the other end, both portions having hand holds 21' and 22' thereon (see Figures 2 and 4), so that in operation, the right or left hand of the user rests on the hand hold 22 attached to the arcuate arms 22 of the blade carrying element as by welding, while with the left hand the cutting element 11 is lifted upwardly in the direction of the dotted lines (see Figure 1), about the pivot 12, so that the blades 23 thereof may be presented in operative position.

As shown in Figures 1 to 3 inclusive, the blades 23 are disposed between the sections 24' and 24" of the unitary stamped wall 24 of the blade carrying element in parallel and equidistant position, the respective blades being mounted at their ends upon bolts 25 and 25' passing through the opposite sections of the wall 24 of the blade carrying element 11, which bolts carry thereon spacer blocks 26 disposed between the respective blades to serve as spacers and bearing surfaces therefor.

The blades comprise a series of substantially V notched stamped metal elements, the lower surfaces of which, merging towards the apex, are sharpened as at 27 and 27' with the apex 28 serving as a piercing point.

As shown in Figures 1 and 3, the centermost blade 23a is the largest and has the greatest depth. On opposite sides of the center-most blade there are disposed similar blades 23b and 23b', 23c and 23c', etc., of lesser scope and lesser depth, the respective blades on opposite sides of the center-most blade decreasing one with respect to the other in proportion (see Figure 3).

By use of the blades of this nature, the cutting element, when depressed, will so operate as to first cause the piercing point of the center-most blade to penetrate a food product, the cutting surfaces leading towards such piercing point of such plate will then cut along the food product from the area or zone thereof pierced until the piercing points of the second set of blades 23b and 23b' contact with the surfaces of the food product, at properly spaced position at opposite sides of the center-most blade, after which the cutting surfaces leading to the piercing point thereof likewise cut the food product along the zone already pierced; as the cutting element is further depressed towards the full line position shown in Figure 1, the respective piercing points and cutting surfaces of all the blades come into play, until the cutting element reaches full line position shown in Figure 1 and Figure 3, whereupon the food product is completely sliced and the cutting blades and the support carrying the same are at or below the horizontal upper surface of the receptacle, whereupon the sliced food product, be it a tomato, orange or lemon may be lifted out of the receptacle for use.

The oval shaped carrying portion 15 serves to permit the slight displacement to the left or right of the food product during the piercing and cutting operation, so as to limit any pressure effect, such as crushing of the same while being sliced.

It is obvious that various changes and modifications may be made to the details of construction without departing from the general spirit of the invention as set forth in the appended claims.

I claim:

1. In a device of the class described, the combination with a receptacle for a food product, of a slicing element pivotally mounted with respect to said receptacle, said slicing element comprising a series of blades of V-notch formation, but of varying size and shape, said blades having cutting edges terminating into piercing points.

2. In a device of the class described, the combination with a receptacle for a food product having a series of slots formed therein, and a cutting element pivoted with respect to said receptacle, and having a series of cutting blades of V-notch formation adapted to project into the slots in the receptacle when the cutting element is depressed, the centermost blade being of greatest depth and the remaining blades on opposite sides thereof being of varying size.

3. In a device of the class described, the combination with a receptacle for a food product of a depressed carrier portion therein having a series of slots extending in the same direction, and a slicing element comprising a series of spaced cutting blades of V-notch formation disposed so as to be in alignment with and adapted to project within the slots in the carrier when the slicing element is depressed, said cutting blades being of similar formation, but of varying size and shape, and having piercing points at the lower-most extremity of the cutting edges thereof.

4. In a device of the class described, the combination with a receptacle for a food product of a depressed carrier portion therein having a series of slots extending in the same direction, and a slicing element comprising a series of spaced cutting blades of V-notch formation disposed so as to be in alignment with and adapted to project within the slots in the carrier when the slicing element is depressed, said cutting blades being of similar formation, but of varying size and shape, and having piercing points at the lower-most extremity of the cutting edges thereof, the center-most cutting blade being of greater size and the blades on opposite sides thereof being of progressively smaller size.

5. In a device of the class described, the combination with a frame having a depressed carrier portion therein, in which is disposed a series of spaced slots, a slicing element pivoted at one end of the frame distant from the depressed carrier portion therein, said slicing element comprising a series of spaced cutting blades disposed in spaced relationship so as to be in alignment with and to project within the slots of the carrier portion when the slicing element is depressed, said cutting blades being V-notched in formation, the respective sides of the blades merging towards the apex, the cutting edges on said blades terminating in piercing points at the apex thereof.

6. In a device of the class described, the combination with a frame having a depressed carrier portion therein, in which is disposed a series of spaced slots, a slicing element pivoted at one end of the frame distant from the depressed carrier portion therein, said slicing element comprising a series of spaced cutting blades disposed in spaced relationship so as to be in alignment with and to project within the slots of the carrier portion when the slicing element is depressed, said cutting blades being V-notched in formation, the respective sides of the blades merging towards the apex, the cutting edges on said blades terminating in piercing points at the apex thereof, the centermost blade being of greatest depth, and the blades on opposite sides thereof being of progressively lesser depth.

CHARLES DAUM.